Figure 1:
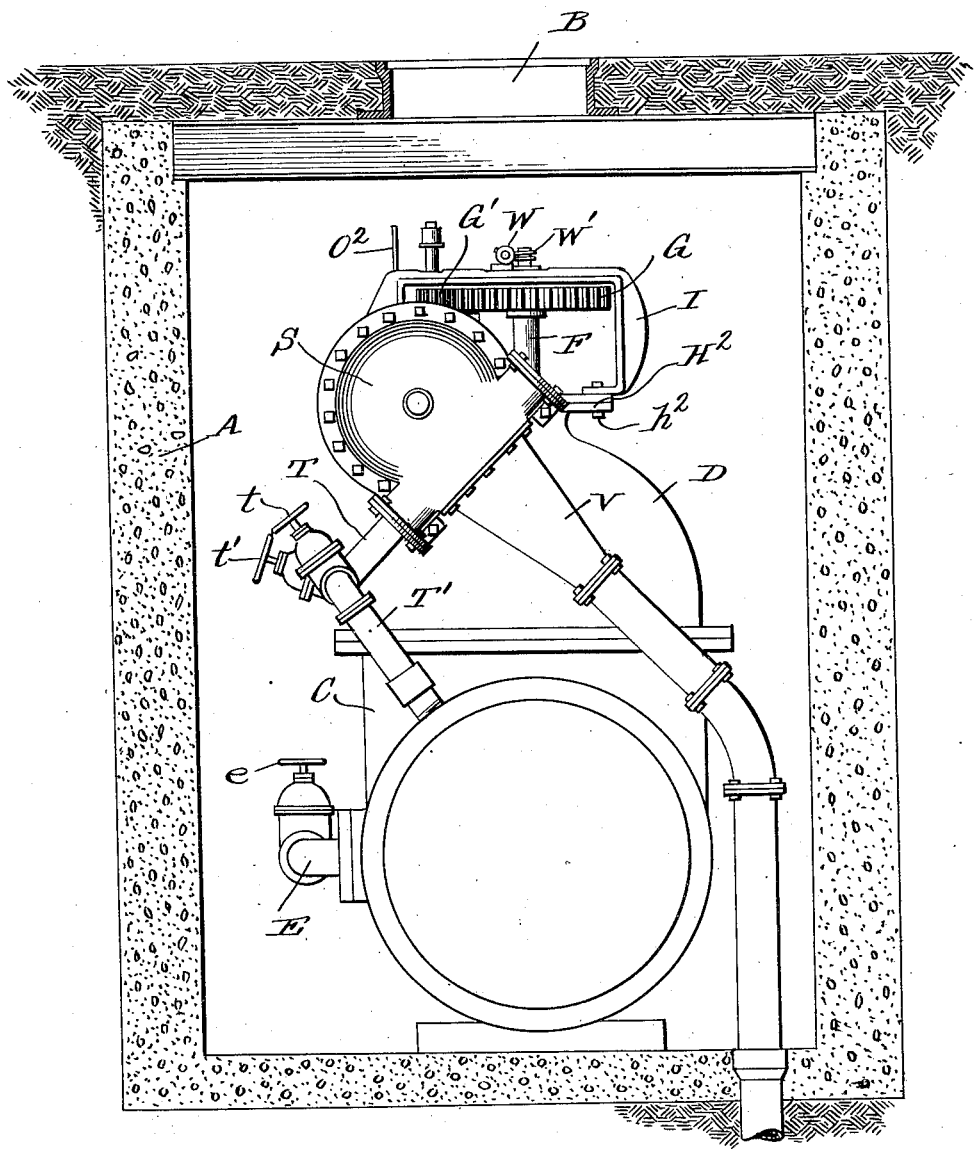

W. A. McFARLAND.
SHUT-OFF VALVE OPERATING MECHANISM.
APPLICATION FILED DEC. 16, 1912.

1,088,159.

Patented Feb. 24, 1914.
3 SHEETS—SHEET 1.

Witnesses
Thomas Durant
Halbert Brown

Inventor
Walter A. McFarland
By Church & Church
His Attorneys

W. A. McFARLAND.
SHUT-OFF VALVE OPERATING MECHANISM.
APPLICATION FILED DEC. 16, 1912.

1,088,159.

Patented Feb. 24, 1914.

3 SHEETS—SHEET 2.

Witnesses
Thos. Sruant
Halbert Brown.

Inventor
Walter A. McFarland
By Church & Church
His Attorneys

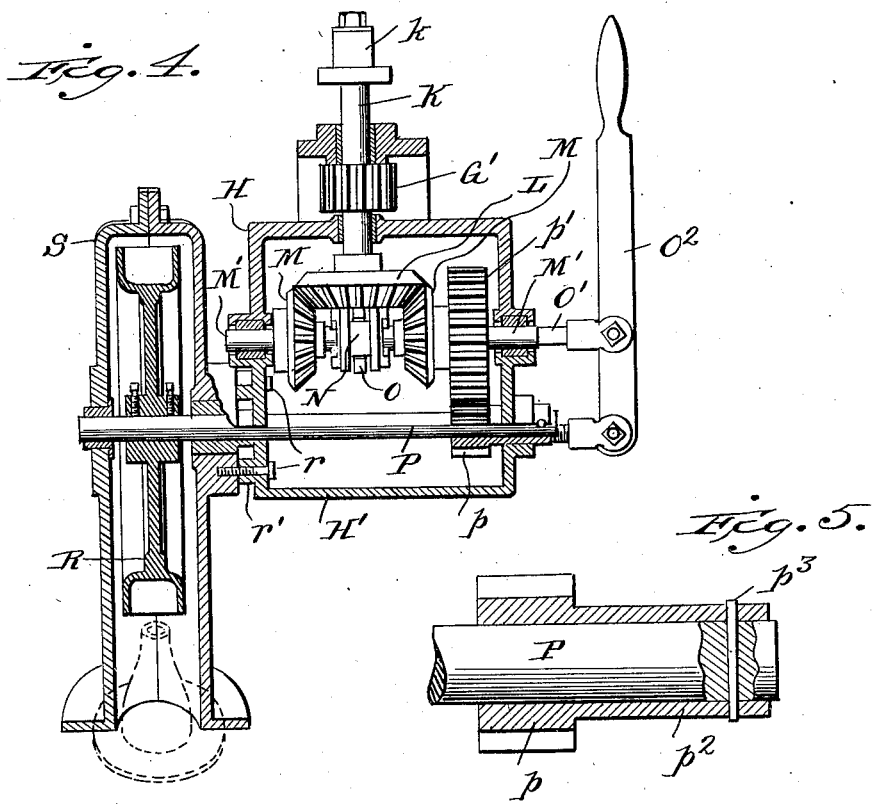
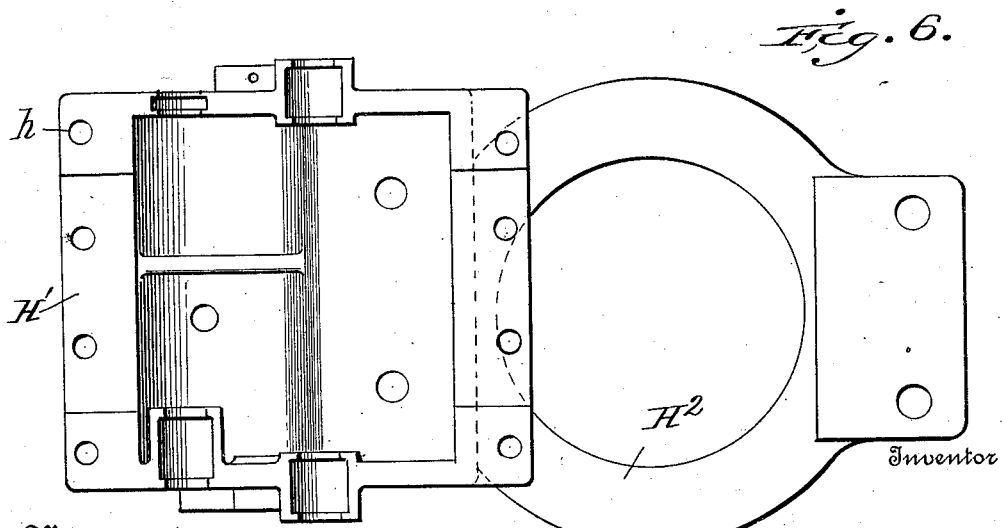

UNITED STATES PATENT OFFICE.

WALTER A. McFARLAND, OF WASHINGTON, DISTRICT OF COLUMBIA, ASSIGNOR, BY DIRECT AND MESNE ASSIGNMENTS, OF TWO-THIRDS TO CARROLL BEALE AND ONE-SIXTH TO PETER RATHBONE LABOUISSE, BOTH OF WASHINGTON, DISTRICT OF COLUMBIA, AND ONE-SIXTH TO HALLOCK D. DAY, OF UPPER FALLS, MARYLAND.

SHUT-OFF-VALVE-OPERATING MECHANISM.

1,088,159. Specification of Letters Patent. Patented Feb. 24, 1914.

Application filed December 16, 1912. Serial No. 737,095.

*To all whom it may concern:*

Be it known that I, WALTER A. McFARLAND, a citizen of the United States, residing at Washington, in the District of Columbia, have invented certain new and useful Improvements in Shut-Off-Valve-Operating Mechanism; and I do hereby declare the following to be a full, clear, and exact description of the same, reference being had to the accompanying drawings, forming part of this specification, and to the figures and letters of reference marked thereon.

This invention relates to mechanism for operating shut-off valves such as are commonly employed for controlling the flow of water in large supply mains.

Shut-off valves are located in water supply mains at salient points or at suitable intervals, particularly for the purpose of enabling any section of a main to be deprived of its supply, especially in the case of a break or leak or at the time when laterals are to be connected with the main. Owing to the conditions under which the valves are used they are liable to become inoperative because of accumulations or corrosion, and it is therefore customary to operate them at intervals so as to be assured that they will be in condition for operation should an emergency arise.

In nearly all municipalities a comparatively large force of men is employed practically all of the time in testing and operating the shut-off valves of the supply mains, and it is one of the principal objects of the present invention to provide a comparatively cheap and compact valve operating mechanism which may be operated by one man to quickly open, shut or move the valve.

Other objects of the invention are to provide a power mechanism which may be mounted directly upon the bonnet of a shut-off valve casing and be of such dimensions and character that it may not only be located in the valve pit without interfering with access to the valve, but be itself practically as free from deterioration through non-use as is the valve and its casing.

It has already been proposed to make use of water motor operating mechanisms for shut-off valves, and also electric motor operating mechanisms, but as heretofore constructed the electric motor operating mechanisms have proven inefficient because of the necessity of locating the same in situations where they would be subjected to rapid deterioration or be rendered inoperative by accumulations of water and moisture, and the water motor operating mechanisms have heretofore been of such construction that they necessitated material alteration in the arrangement of the valves and in the dimensions of the valve pits; thus, while they might be utilized in new constructions, it has been found practically impossible to make use of them in connection with valves already installed or in pits of the present construction with valves of the ordinary type. A properly designed valve operating mechanism made in accordance with the present invention will lie within what might be termed the maximum dimensions of the valve and its casing, whereby no alteration in either the valve or valve pit is necessary for the installation of the operating mechanism.

Figure 2:
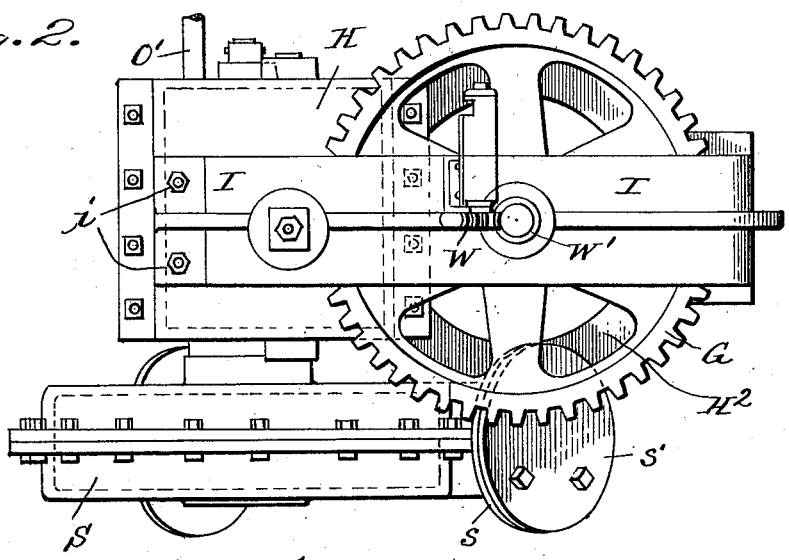
Figure 3:
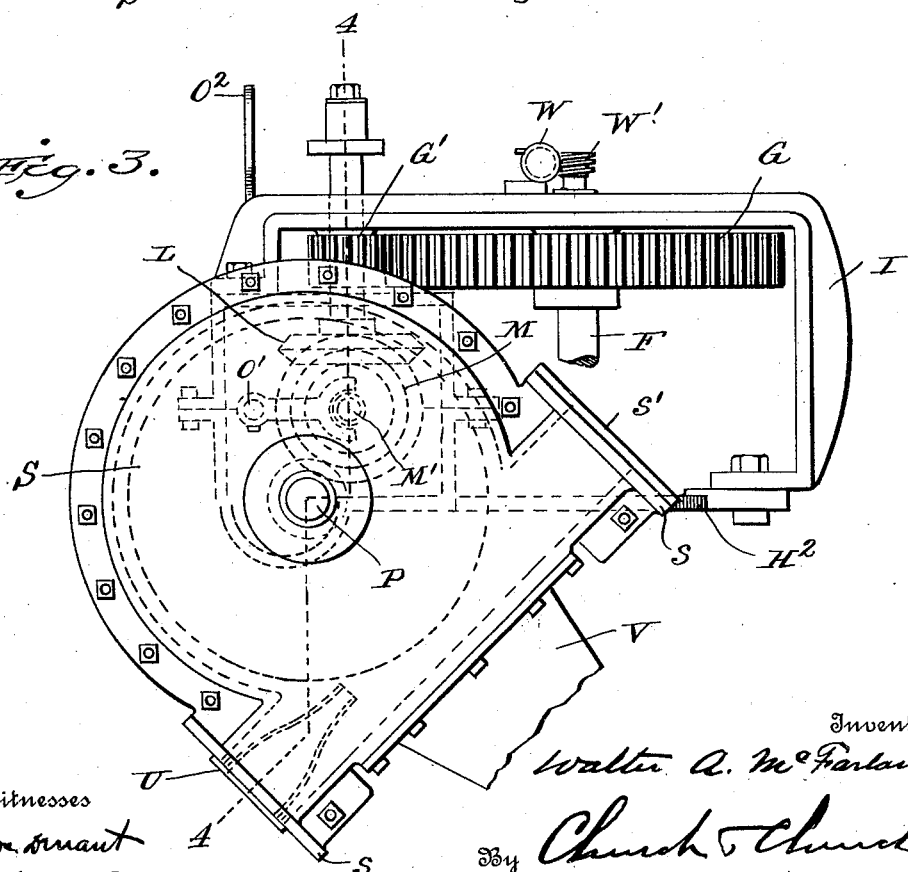

Referring to the accompanying drawings,—Figure 1 is a section illustrating conventionally a shut-off valve pit with a shut-off valve therein to which the motor mechanism of the present invention has been applied. Fig. 2 is a top plan view of the motor mechanism, valve stem, and gear wheel on the valve stem. Fig. 3 is a front elevation of the parts illustrated in Fig. 2. Fig. 4 is a sectional elevation substantially in the broken plane indicated by the dotted line 4—4 of Fig. 3. Fig. 5 is a detail sectional elevation illustrating the strain limiting device. Fig. 6 is a top plan view of the lower half of the gear box with its extended base, whereby it is rigidly mounted on the top of the bonnet of the valve casing.

Like letters of reference in the several figures indicate the same parts.

In said drawings, the letter A indicates the wall of a valve pit of conventional form having an entrance opening formed by a manhole B, usually located centrally at the top of the pit.

The valve and its casing C with the casing bonnet D are of conventional construction, there being as usual a by-pass E, controlled by a hand valve *e*, extending around the valve for the purpose of evening up the pressure in the two sections of the main, when the valve is to be manipulated. When open, the movable members or gates of the valve or located within the bonnet D and their movements are effected by the rotation of the upwardly projecting valve stem F. The valve stem F has heretofore ordinarily been rotated by manual power applied directly thereto or to a key shaft which is geared to the valve stem so as to obtain an increased leverage. The gearing customarily employed embodies a gear wheel G on the valve stem, and I prefer to retain this gear wheel or to provide a similar gear wheel of proper dimension for the coöperation of the motor driven gearing to be presently described.

Mounted directly on the bonnet D and at one side of the valve stem F there is a gear box usually formed in top and bottom sections H and H', the top section being removably held in place by bolts extending through the flange holes $h$, Fig. 6, and the bottom section being bolted directly to the bonnet D and preferably having a laterally extending base $H^2$, taking a bearing on the bonnet flange around the valve stem F and bolted thereto as indicated at $h^2$, in Fig. 1. A supplemental yoke or frame I is secured by the bolts at $h^2$ to the base $H^2$, extending thence up and over the gear wheel G and at its opposite end bolted to the gear box at $i$. A suitable bearing is formed in this frame I for the upper end of the valve stem, and also for a vertical key-shaft K, which latter extends through both the supplemental frame I and top of the gear box, being provided between the frame and gear box with a pinion G' meshing with the gear wheel G. The key shaft K has at its upper end an operating nut or cap $k$ for the application of a suitable key or lever whereby the valve may be manually operated. The lower end of the key shaft K is provided with a bevel gear wheel L meshing with a pair of oppositely disposed bevel gear wheels M journaled on a transverse shaft M' mounted in suitable bearings in the gear box, one or the other of said gear wheels M being adapted to be clutched to the said shaft M' by a clutch member N mounted on the shaft between the gear wheels and operated by a fork O carried by a sliding shaft O' pivotally connected with a hand lever $O^2$ located at one side of the gear box in position to be readily accessible, but at the same time at one side of any point where it could interfere with the operation of the valve or interfere with the accessibility of any of the parts.

Journaled in the gear box below the manually controlled gearing just described, is a main operating or drive shaft P, preferably projecting at both sides of the gear box and having thereon a pinion $p$, which meshes with a gear wheel $p'$ on the shaft M', whereby the latter is rotated. The pinion $p$ is connected with the shaft P by a strain limiting device, whereby danger of rupturing the gearing or valve is overcome should the resistance of the valve be greater than the strain for which the gearing is designed. Conveniently the pinion $p$ is provided with or formed as an integral part of a sleeve $p^2$, which surrounds the shaft P and extends to the outer side of the gear box, as will be readily understood from Figs. 4 and 5. At a point beyond the bearing in the gear box the sleeve and shaft are connected by a transverse shear pin $p^3$, which, it will be noted, is in a convenient and accessible position and may be renewed if broken, without the necessity of opening the gear box or disturbing any of the working parts. On the projecting end of the drive shaft P on the opposite or front side of the gear box, there is mounted a water motor wheel R, conveniently of the Pelton type. The wheel thus occupies a vertical position at one side of the gear box, and with its periphery well below the top or upper end of the valve stem, while the lower portion of the wheel extends down beside or in front of the bonnet D. Surrounding the water motor wheel is a casing S formed in vertical halves bolted together, and bolted to the side of the gear box by bolts $r$, shown in Fig. 4, there being suitable positioning projections $r'$ cast on the side of the gear box against which the hub of the casing may rest and be properly positioned when the parts are assembled.

In the construction of the water motor wheel casing, provision is made whereby the jet may be directed tangentially at the buckets in a plane inclined to the horizon. In some instances the jet is directed upwardly and in others downwardly, and in either case the waste may be carried off in line with the jet or transversely thereto, the latter arrangement being the preferred arrangement, and the one illustrated in the drawings.

By reference particularly to Figs. 1 and 3 it will be seen that the water wheel casing S is formed with a straight passage-way therethrough intersecting tangentially the buckets on the wheel and having flanges $s$ at the opposite ends. The lower flange $s$ serves for the attachment of the flange of the supply pipe T, where the arrangement is shown in Fig. 1, while the upper flange $s$ serves for the attachment of a cover plate $s'$, although the latter may be replaced by a discharge duct which leads up and out of the pit where there is no provision within the pit for carrying off the discharge water. The nozzle U shown in doted lines in Fig. 3 is held in place by having its flange recessed into the end or flange of the supply pipe T, and so as to be clamped thereby. Obviously, it may be located at either end of the tangential passage way through the valve casing, so that it may be directed upwardly as shown, or diagonally down in the opposite direction, and by making the water wheel so that it may be reversed on its shaft P, the wheel may be made to run in either direction, although it is what is known as a one-way wheel, the reversing of the direction of rotation of the valve stem being secured by the manually controlled reverse gearing before referred to.

Waste water from the water wheel is preferably carried off transversely of the jet and radially of the water wheel through a discharge funnel or duct V bolted around an opening in the edge of the casing at a point transverse to the tangential passage through the casing, the duct V, if desired, leading down through the bottom of the pit to a suitable waste or sewer connection.

The nozzle supply pipe T receives water from the main which is controlled by the valve through branches T' (one of which is shown in Fig. 1), leading to the main on opposite sides of the valve, and preferably independent of the by-pass E. Each branch T' is controlled by a separate valve, the two valves being indicated in Fig. 1 at $t$ and $t'$, whereby pressure may be taken from either side of the shut-off valve without being interfered with by the rush of water through the by-pass.

The frame I which extends over the gear wheel G and pinion G' forms a convenient support for an indicator W operated by a worm W' on the upper end of the valve stem whereby the position of the valve will be shown and the operator by manipulating the lever $O^2$ can open, shut or move to any degree desired the main shut-off valve with certainty and without danger of rupturing the parts by imposing excessive strains thereon, although the strain limiting device before referred to will prevent destructive or dangerous breakage in case a careless operator should permit the valve to reach the limit of its movement while the motor mechanism is running at full speed.

It will be noted that the construction and arrangement of the parts described not only reduces the mechanism to the simplest possible elements, but the dimensions of the same are kept well within the maximum dimensions of the shut-off valve casing and parts necessarily employed in connection therewith; that is to say, the motor mechanism does not project above the height of the valve stem nor laterally beyond the transverse dimensions of a shut-off valve of ordinary construction. By reason of this construction the available space in the pit is not reduced materially and the operator can obtain ready access to all of the parts of the valve. The structure embodies no delicate mechanism nor any mechanism which will be injured by being submerged or subjected to the exceedingly unfavorable conditions under which it must operate.

Having thus described my invention, what I claim as new and desire to secure by Letters Patent of the United States, is:

1. In a shut-off valve operating mechanism, the combination with the valve casing and its upwardly extending bonnet and valve stem projecting through the bonnet, of a gear box mounted on the bonnet at one side of the valve stem, manually controlled valve stem operating gearing located in the gear box and embodying a horizontal drive shaft located at the bottom of the box below the manually controlled gearing and at one side of the top of the bonnet, a vertical water motor wheel mounted on said shaft at one side of the box and extending down beside the bonnet, the top and horizontal dimensions of the box and water wheel being within the maximum dimensions of the valve casing and stem.

2. In a shut-off valve operating mechanism, the combination with the valve bonnet and valve stem projecting through the bonnet, of a gear box located at one side of the valve stem and having a base plate extending across and secured to the top of the bonnet, a vertical shaft journaled in the gear box, an intermeshing pinion and gear wheel on the vertical shaft and valve stem respectively, both located above the gear box, a frame carried by the gear box and extending around the pinion and gear wheel, manually controlled gearing in the gear box with a drive shaft therefor, projecting at one side of the bottom of the box, a vertical water motor wheel mounted on the projecting end of the shaft and a casing surrounding said wheel and secured to the side of the box.

3. In a shut-off valve operating mechanism, a gear box having a laterally projecting base adapted to be secured to the top of a shut-off valve bonnet, transverse shafts journaled in the box and having intermeshing gear wheels thereon, a vertical key shaft having a pinion thereon for operating the valve stem and a bevel gear wheel, oppositely arranged bevel gear wheels journaled on one of the transverse shafts and meshing with the gear wheel on the key shaft, a manually operated clutch for coupling the transverse shaft and gear wheels, a water motor wheel on the end of the other transverse shaft outside the gear box, and a casing for the water motor wheel secured to the side of the gear box.

4. In a shut-off valve operating mechanism, the combination with a gear box provided with means whereby it may be secured to the bonnet of a valve casing, drive gearing mounted within said box and embodying transverse shafts journaled in the box, one of said shafts extending through the side of the box and having thereon a water motor wheel, a pinion for said gearing mounted on said shaft and having a sleeve extending through the side of the box with a strain limiting pin connecting said sleeve and shaft on the outside of the box.

5. In a shut-off valve operating mechanism, the combination with a gear box, a shaft journaled in said box and having its ends extended on opposite sides of the box, a water motor wheel mounted on one end of said shaft, valve stem operating gearing within the box embodying a pinion on the said shaft having a sleeve surrounding the shaft and extending through the side of the gear box opposite the water motor wheel and a strain limiting pin connecting said sleeve and shaft outside of the gear box.

WALTER A. McFARLAND.

Witnesses:
DANIEL E. GARGES,
E. E. HELM.

Copies of this patent may be obtained for five cents each, by addressing the "Commissioner of Patents, Washington, D. C."